US010724765B2

(12) United States Patent
Arjomandi et al.

(10) Patent No.: US 10,724,765 B2
(45) Date of Patent: Jul. 28, 2020

(54) SOLAR RECEIVER

(71) Applicant: The University of Adelaide, Adelaide (AU)

(72) Inventors: Maziar Arjomandi, Rostrevor (AU); Graham Jerrold Nathan, Ironbank (AU); Alfonso Chinnici, Adelaide (AU); Zhao Tian, Adelaide (AU)

(73) Assignee: The University of Adelaide, Adelaide (AU)

( * ) Notice: Subject to any disclaimer, the term of this patent is extended or adjusted under 35 U.S.C. 154(b) by 197 days.

(21) Appl. No.: 15/750,297

(22) PCT Filed: Aug. 12, 2016

(86) PCT No.: PCT/AU2016/000278
§ 371 (c)(1),
(2) Date: Feb. 5, 2018

(87) PCT Pub. No.: WO2017/024338
PCT Pub. Date: Feb. 16, 2017

(65) Prior Publication Data
US 2018/0224163 A1    Aug. 9, 2018

(30) Foreign Application Priority Data
Aug. 13, 2015  (AU) .................................. 2015903261

(51) Int. Cl.
F24S 60/00        (2018.01)
F24S 80/20        (2018.01)
(Continued)

(52) U.S. Cl.
CPC ............ F24S 60/00 (2018.05); B01J 19/127 (2013.01); F24S 20/20 (2018.05); F24S 80/20 (2018.05); Y02E 10/41 (2013.01)

(58) Field of Classification Search
CPC ...................................................... F24S 20/20
See application file for complete search history.

(56) References Cited

U.S. PATENT DOCUMENTS 4,499,893 A * 2/1985 Hunt ..................... F24S 20/20
126/674
5,931,158 A * 8/1999 Buck ..................... F24S 10/80
126/680

(Continued)

FOREIGN PATENT DOCUMENTS

EP        0509286 A1    10/1992
WO     WO-9625633 A1    8/1996
WO   WO-2015048845 A1    4/2015

OTHER PUBLICATIONS

Machine translation of EP059286A1, Google Patents, retrieved Oct. 1, 2019 (Year: 2019).*

(Continued)

Primary Examiner — Avinash A Savani
Assistant Examiner — Deepak A Deean
(74) Attorney, Agent, or Firm — Marshall, Gerstein & Borun LLP

(57) ABSTRACT

A solar receiver for exposing heat absorbing particles to concentrated solar radiation. The solar receiver includes a chamber having an aperture through which concentrated solar radiation can be received within the chamber. An inlet means provides for introducing an inflow including solar absorbing particles into the chamber. An outlet means provides for discharge of an outflow from the chamber. The inlet means communicates with the chamber for introduction of the inflow into a first section of the chamber in opposed relation the aperture. The outlet means communicates with a second section of the chamber disposed between the first section and the aperture, wherein fluid flow from the inlet means to the outlet means is exposed to concentrated solar (Continued)

radiation received within the chamber. The first section diverges in a direction towards the aperture, and the inlet means is configured to introduce the inflow tangentially into the divergent first section.

18 Claims, 11 Drawing Sheets

(51) Int. Cl.
*B01J 19/12* (2006.01)
*F24S 20/20* (2018.01)

(56) References Cited

U.S. PATENT DOCUMENTS

| | | | | |
|---|---|---|---|---|
| 5,947,114 A * | 9/1999 | Kribus | ............... | F24S 20/20 126/680 |
| 6,827,082 B1 * | 12/2004 | Kogan | ............... | B01J 19/127 126/680 |
| 7,449,158 B2 * | 11/2008 | Haueter | ............... | C10G 1/00 126/680 |
| 8,524,187 B2 * | 9/2013 | Chalabi | ............... | F23G 7/065 423/245.1 |
| 8,941,000 B2 * | 1/2015 | Martin | ............... | H01L 31/0521 136/246 |
| 2005/0210876 A1 * | 9/2005 | Karni | ............... | F24S 20/20 60/641.15 |
| 2012/0141332 A1 * | 6/2012 | Fridman | ............... | B01F 5/0068 422/186.04 |
| 2016/0091508 A1 * | 3/2016 | Zhao | ............... | B01L 3/502715 435/287.1 |

OTHER PUBLICATIONS

European Supplemental Search Report for Application No. EP 16 83 4304, dated Aug. 2, 2018.
International Search Report and Written Opinion of the International Searching Authority, International Application No. PCT/AU2016/000278, dated Sep. 13, 2016.

* cited by examiner

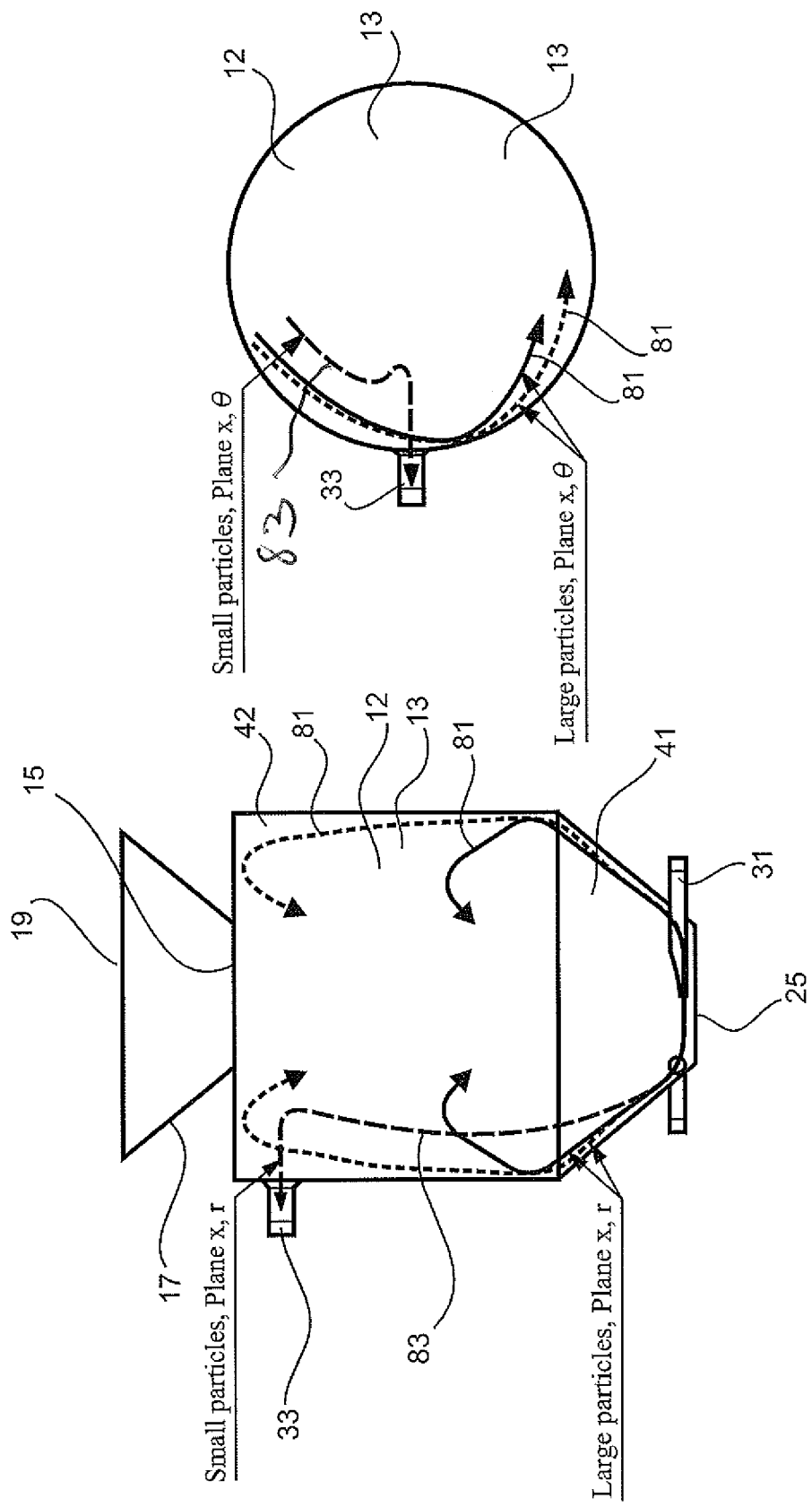

| Configuration # | Cone angle α (°) | Aperture $d_{ap}$ (mm) | $D_c/d_{ap}$ | Reactor length L (mm) | $S_{ap}$ |
|---|---|---|---|---|---|
| SEVR-65 | 65 | 400 | 3 | 1500 | 0.1 |
| SEVR-50 | 50 | 400 | 3 | 1500 | 0.32 |
| SEVR-40 | 40 | 400 | 3 | 1500 | 0.45 |
| SEVR-30 | 30 | 400 | 3 | 1500 | 0.8 |
| SEVR-15 | 15 | 400 | 3 | 1500 | 0.92 |
| SEVR-D1 | 40 | 400 | 1 | 1500 | 0.99 |
| SEVR-D4 | 40 | 400 | 4 | 1500 | 0.5 |
| SEVR-D5 | 40 | 400 | 5 | 1500 | 0.52 |
| SEVR-L800 | 40 | 400 | 3 | 800 | 1.08 |
| SEVR-L2500 | 40 | 400 | 3 | 2500 | 0.5 |
| SEVR-A600 | 40 | 600 | 3 | 1500 | 0.68 |
| SEVR-A200 | 40 | 200 | 3 | 1500 | 0.08 |
| SEVR-A150 | 40 | 150 | 3 | 1500 | 0.04 |

Table 1: Geometrical details of the SEVR configurations investigated and the correspondent calculated flow Swirl number at the aperture plane, $S_{ap}$.

Fig. 9

|  | Value |
|---|---|
| L, mm | 500 |
| $D_c$ $D_0$, mm | 400 |
| α, ° | 50 |
| $l_{in}$, mm | 17 |
| $l_{out}$, mm | 50 |
| $d_{ap}$, mm | 50-100-150-200 |
| $d_{in}$, mm | 12.5 |
| $d_{out}$, mm | 21 |
| $d_{sc}$, mm | 200 |
| $l_{sc}$, mm | 125 |

Table 2: Geometrical details of the SEVR configurations experimentally investigated

Fig. 12

SOLAR RECEIVER

CROSS-REFERENCE TO RELATED APPLICATIONS

This is the United States national phase of International Patent Application No. PCT/AU2016/000278, filed Aug. 12, 2016, which claims the priority benefit of Australian Patent Application No. 2015903261, filed Aug. 13, 2015. The entire contents of each of the foregoing is expressly incorporated herein by reference.

TECHNICAL FIELD

This invention relates to a solar receiver for exposing heat absorbing particles to concentrated solar radiation.

The invention also relates to a method of exposing heat absorbing particles to concentrated solar radiation using a solar receiver, and also to a method of heating particles by exposure of the particles to concentrated solar radiation using a solar receiver.

BACKGROUND ART

The following discussion of the background art is intended to facilitate an understanding of the present invention only. The discussion is not an acknowledgement or admission that any of the material referred to is or was part of the common general knowledge as at the priority date of the application.

Technologies to harness energy from renewable energy sources, such as solar energy, are attracting growing attention due to the increasing awareness of global climate change as a consequence of greenhouse gases emissions from anthropogenic sources, together with the need to mitigate air pollution, the long term resource constraints of fossil fuels and desire to participate in the growing market for renewable energy technologies. Concentrating Solar Thermal (CST) is a rapidly growing technology field owing to its capacity to harness the entire solar spectrum, to achieve high efficiency through achieving high temperatures and because of its good compatibility with conventional thermal energy technologies. The most efficient way to transfer the concentrated solar radiation from the sun to the end product is via direct irradiation of particle "clouds" (i.e. suspensions of closely spaced particles) through an open aperture or through a window, rather than through the walls of a tube. This is because a wall is at a much lower temperature than the sun, as limited by its melting temperature, which reduces the amount of heat transfer. Particles have the additional advantage that they are efficient absorbers of radiation and they are well suited to high temperature storage of thermal energy, which is cheaper and more efficient than is the storage of electrical energy, while energy storage is necessary to mitigate the intermittent availability of solar radiation. Particles can be either inert or reactive, with the latter offering the further advantage that chemical energy carriers are long-term, transportable and dispatchable. The devices used to capture radiation with particles in CST systems are called "particle receivers".

Solar particle receivers for high-temperature applications generally adopt a cavity-type configuration, both to contain the particles and to control heat losses. Such a configuration comprises a well-insulated enclosure defining a cavity and an opening, or aperture, for an effective capture of the incident concentrated solar radiation. The methods for heating the particulate solid feedstock to high temperatures can be divided in two types: directly irradiated and indirectly irradiated receiver. In the former, the particles are directly irradiated with the concentrated solar radiation, either through a window or an open aperture, while in the latter the heat from solar radiation is transferred by convection and radiation through the reactor walls that receive the radiation. While the working temperature of the indirectly irradiated receiver is limited by the thermal property limitations of the wall absorber, the directly irradiated configuration does not have this limitation, which results in faster heating rates and enhanced kinetics, together with the capacity to achieve higher temperatures.

A directly-irradiated particle receiver can be employed for industrial process heat applications, solar energy including fuels and chemicals production or for heating the working fluid in a power cycle, such as air in a Brayton cycle, for electricity generation. The solid particles can act as a storage and heat transfer medium or as a "substrate" on which chemical reactions can occur.

One concept of solid particle receiver first proposed in the 1980s called the "falling particle cloud receiver", was developed for thermal and thermochemical applications. This receiver is usually mounted atop a tower to capture the focused solar energy from a field of heliostats. Sand-size (100-1000 μm) ceramic particles fall down freely into a solar receiver, forming a curtain that directly absorbs the concentrated solar radiation that passes through an aperture. Once heated, the particles can be collected in an insulated tank and/or used to heat a secondary working fluid (e.g. air, steam, CO2). Since the solar energy is directly absorbed inside the inert particles, the heat flux limitations associated with other solar receivers (e.g. tubular central receivers) are avoided and high temperatures (above 1000° C.) can be reached.

However, despite its benefits, the falling particle receiver configuration encompasses several disadvantages. In particular:

a) It does not have a means to control the particle residence time within the cavity as a function of particle size. Several studies have shown that the cavity efficiency and the particle outlet temperature decrease as the particle size increases. This is due to the fact that larger particles need a longer residence time than do smaller ones owing to their higher thermal capacity. Indeed, an increase of the particle size leads to an increase of the particle vertical velocity (larger particles fall faster than smaller particles), thereby reducing the residence time of large particle inside the receiver. Hence, this process is most efficient for mono-disperse particles, which adds significantly to the cost.

b) The particle residence time within the cavity is short. Methods for increasing the temperature of the particles include the use of recirculation and other means to increase the residence time of the particles within the receiver, such as obstructions, inclined plates, porous structures, spiral and centrifugal receivers. However, physical components in high temperature environments reduce the reliability of the system. In addition, these methods are not able to control the particle residence time within the cavity as a function of particle size.

c) The impact of the particles with the collection hopper, structures, or other particles, cause abrasion, degradation and attrition of the particles, so that the particle receiver must operate with a wide range of particle sizes. This leads to a decrease of the process efficiency for the reasons reported above.

In an alternative device, solid particles can also be adopted to improve the efficiency of conventional volumetric receiver. A volumetric receiver utilises a block with large internal surface area, such as honey-comb, to absorb the radiation and transfer the heat to the surrounding fluid by convection. One study reported an experimental evaluation of a small particle air receiver (10 KW) in which the working gas was seeded with sub-micrometre carbon particles to absorb the radiation. These particles were found to be effecting in increasing to heat transfer to allow very high temperatures (of up to 1800° C.) to be reached at the receiver outlet. Additionally, the particle cloud partially shields the receiver cavity's wall from the concentrated irradiation, reducing some of the material and structural limitations associated with conventional volumetric receivers. However, this device presents several challenges:

a) It requires the development of a solid/gas suspension system that maintains a uniform and high concentration of particles in the receiver since the scattering properties and the residence time of the particles vary significantly with the particle size;

b) It requires the use of sub-micron particles, which are difficult to separate from the fluid at the outlet of the receiver;

c) It does not address the problem of avoiding particle deposition on a window. Since the main application for volumetric receivers is in gas turbines, it is necessary to pressurise the air before heating. This requires a window. No method to prevent this deposition has been proposed.

Particle receiver-reactors perform an additional process of reaction over particle receivers, so that the particles undergo both heat absorption and chemical conversion. A solar receiver-reactor is invariably utilised to drive an endothermic reaction and so requires additional residence time for the reaction in addition to the sensible heating. In addition, it and must also provide good mixing of the reactants and good sealing from the ambient air to avoid unwanted reactions. Several types of particle receiver-reactor have been developed, to provide different ranges of residence time within the receiver and/or convey different carrier fluids and reactants, together with the solid particles. According to several studies, solar particle receiver-reactors can be categorized in packed bed, fluidized bed and entrained flow reactors. Each group has its characteristic particle size, residence time and operating temperature. This classification is also applicable to solid particle receivers where inert particles are used. In addition, it is important to note that for each reactor group analysed, the heating of inert particles has the same basic issues of chemically reacting particles, although the details are different.

The processing requirement for particles and the selection of the particle receiver fundamentally depend both on the particle size and on their other characteristics, such as density, porosity and reaction time. In particular the particle size influences significantly the heat and mass transfer inside the particle. These can be described by dimensionless numbers. The temperature uniformity within a particle are characterized by the Biot number, Bi, defined as:

$$Bi = \frac{hd_p}{k_s},$$

where h is the external heat transfer coefficient, ks the thermal conductivity of the solid particle and $d_p$ the particle diameter. For small Bi (<<1), the temperature is uniform inside the whole volume of the particle while for large Bi (>>1) a steep temperature gradients exists inside the particle. These gradients significantly affect the heat transfer behaviour to a particle and thus the overall heating process. It is important to note that Bi increases linearly with the particle size. A literature review suggest that most entrained solar reactors are characterized by very small Bi, while higher values can be found for packed and fluidized bed.

Similarly to the heat transfer, the mass transfer inside a particle can be described by the Sherwood number, Sh, where Sh is defined as:

$$Sh = \frac{h_m d_p}{D},$$

where $h_m$ is the gas-to-particle mass transfer coefficient and D is the mass diffusivity of the fluid. As highlighted for Bi, the Sh also depends on the particle size and it increases linearly with the particle size. This implies that the mass transfer behaviour inside a particle significantly varies with the particle diameter.

Entrained flow solar reactors operate at elevated temperatures, usually above 1500 K, to compensate for their relatively short residence time. The particles need to be micron-sized (generally 1-200 μm) for them to be kept in suspension, i.e. "entrained", heated and/or fully react within the reactor cavity by directly absorbing the solar radiation that enters the cavity through the aperture. A vortex flow is employed in all known solar entrained flow reactors to keep the majority of particles away from the aperture, to increase the particle residence time and augment the solar absorption by keeping the particles near the wall. Hence, these reactors are also referred to solar vortex flow reactors (SVR).

In comparison with SVRs, fluidized beds provide a much higher volumetric loading, increased particle residence time and convective mixing between the particle and the gas. In directly-irradiated solar fluidized beds, the bed is directly irradiated by concentrated solar radiation and the particles are semi-suspended in turbulent motion by the working fluid until they are fully reacted or reach a small enough size to be elutriated and carried out from the bed by the fluid. The distribution of temperature within fluidised beds is highly uniform due to the high heat and mass transfer rates of fluidised beds. Operating working conditions depend on the selection of fluidized solid particle type and size and fluidization regime. Operation is limited by the minimum fluidization velocity, i.e. the minimum velocity required to fluidize the bed, which also entails a pressure drop. The details of the minimum velocity depend upon a number of factors, including the shape, size, density, and poly-dispersity of the particles. Due to their characteristics, fluidized beds can process larger particles in comparison to SVRs (order of mm) while working temperatures are generally lower than SVRs (800-850° C.). However, fluidised bed reactors are typically tall and narrow, so that the surface area of the top of the bed is relatively low. For this reason, the heat transfer to the bed in a solar fluidised bed is limited by this surface area. A known example of directly-irradiated fluidized bed solar reactor with a windowed aperture is of the type having an internally circulating fluidized bed solar gasifier. In such an arrangement, coke particles (particle size range was set to 75-710 μm) were gasified successfully using $CO_2$ as gasifier agent at temperatures below 900° C.

Packed bed solar reactors generally have the largest particles, which require the longest particle residence time and achieve the lowest operating temperature of the three groups. The working fluid, usually steam or CO2, is passed through a packed bed of reactant materials either from above or below while the solid particles are heated by the solar radiation. Although high chemical storage efficiencies can be obtained in these type of reactors, for industrially scaling up, the fixed bed reactor has several technical drawbacks, such as limitations of heat and mass transfer, long residence time and the addition of new bed materials is more difficult.

Although these solar reactor concepts are different from each other, they exhibit some common key issues. In particular:
 a) In entrained flow and packed bed reactors the particle residence time distribution is approximately independent of particle size. This limitation negatively affects either the size of the reactor or the chemical conversion of large particles and the reactor efficiency because the larger particles require longer residence time (typically by a factor that scales with the diameter ratio to the 3rd power) than do the smaller ones to heat up and/or achieve complete conversion. As a consequence, for a reactor scaled for smaller particles, the large particles are under-processed resulting in a lower particle temperature and overall solar-to-chemical conversion efficiency. Alternatively, if the reactor is sized for the large particles, it needs to be over-sized for the small particles, resulting in higher cost and a higher average temperature in the reactor, which in turn leads to higher radiation losses through the aperture. In fluidised bed reactors, instead, the particle residence time distribution depends on particle size. Particles are retained in the bed until they reach the elutriation diameter. Smaller particles are more likely to be elutriated due to their smaller terminal velocity. A high elutriation rate translates to a shorter particle residence time, which in turn lowers conversion;
 b) These receiver-reactors operate with a wide range of particle sizes. This is firstly because the majority of particle generators (e.g. mills, grinders) generate a wide size distribution and, secondly, because particle reactors generate particle breakage and attrition, which breaks the original particles into smaller sizes. Thirdly, many types of chemical reactors consume particles as they are reacted, so that a particle shrinks through the processing stages. However, current receiver-reactors are not designed to optimally accommodate particles of different sizes. Furthermore, the number of large particles within the cavity is relatively small, while the number of fine particles is relatively large owing to the cubic dependence of particle mass on particle diameter;
 c) The reactor window is a critical part of the reactor. Although, this has the advantage of reducing the radiation losses it is vulnerable to particle deposition. Any particle deposition poses a great challenge to the reliable operation of the directly-irradiated particle receiver technology because it reduces the solar efficiency and causes localised heating of the window, which in turn leads to potential failure of the system.

In summary, these issues collectively mean that large particles require a greater residence time within a particle receiver-reactor to be fully processed than do smaller particles. If a reactor is designed so that all particles have a similar residence time, then size of the reactor depends on the size of the largest particle, so the reactor is over-sized for the average particle and becomes very much larger and more expensive than it could be if particle residence time can be controlled as a function of particle diameter. In contrast, a reactor can be smaller and less expensive it if can be designed to provide a longer residence time for larger particles than for smaller particles. This will also lower the average temperature of particles in the reactor, so reducing radiation losses through the aperture.

These issues then generate the need to be able to provide a means to control the particle residence time distribution (RTD) as a function of both particle size and reaction time. That is, the optimum ratio of residence time of large to small particles will vary for different processes. Present solar particle receiver-reactors do not provide any means to either control residence time as a function of particle diameter and/or of reaction time.

The CST for the thermochemical production of solar fuels uses a concentrated solar radiation as energy source to provide the high-temperature process heat needed to drive endothermic chemical reactions, offering a viable path for fossil fuel decarbonisation in the energy sector. Among the available methods for solar fuel production, of particular interest is the steam-based Solar Gasification of carbonaceous solid materials such as coal, biomass or waste materials, which can be used to convert these feedstock materials into high-quality synthesis gas, mainly $H_2$ and CO, usable for power generation in efficient combined cycles and fuel cells, or to produce liquid fuels in the Fischer-Tropsch process. The advantages of using solar energy instead of auto-thermal reactions to provide the process heat are numerous. These include an upgraded to the calorific value of the carbonaceous feedstock, a higher $H_2$ to CO ratio in the product syngas and reduced pollutants discharge due to the lack of combustion. However, this technology is currently more expensive than conventional gasification, so further innovations are required to lower its cost.

Of all directly irradiated solar receiver/reactors, the solar vortex reactor (SVR) has been found to be one of the most promising concepts, being applied successfully to the steam gasification of petroleum coke powder, coke-water slurry and liquefied vacuum residue.

Several examples of SVRs are disclosed in U.S. Pat. Nos. 7,024,857, 7,449,158, and 8,257,454.

Current design of the SVR consists of a cylindrical cavity with a windowed aperture and a compound parabolic concentrator (CPC). Particles are injected into the reactor through tangential inlets to generate a vortex flow within the reactor, which transport the particles through the reactor and achieve effective absorption of the concentrated solar radiation. Typical reactor temperatures are in the range 1300-1800 K, that are common for many thermochemical reactions. Nevertheless, despite its benefits, current design also suffers from the following disadvantages that need to be addressed further. In particular:
 a) Large particles are under-processed relative to small particles. As mentioned above, this is a consequence of the fact that particle residence time distribution within the reactor is independent of particle size. Note that the mass fraction of the larger particles is significant, even though their number is relatively low.
 b) The particle residence time within the cavity is relatively short, so that very high working temperature (above 1400 K) and high-reactivity feedstocks are needed to compensate this drawback. Although the residence time will increase with scale, it is nevertheless desirable to increase the residence time of the largest particles at each scale;

c) The SVR suffers from particle deposition on the reactor window. Current mitigation strategies employ auxiliary gas jets configured to generate a "curtain" of clean gas that seek to mitigate particle deposition onto the window surface. However, the use of auxiliary gas inlets decreases the efficiency of the process significantly since the required mass-rate of purging gas is sufficiently great as to constitute a significant parasitic loss of sensible heat. This strategy also increases the overall costs of the process, both in CapEx and OpEx. Finally, the optimal configuration of the purging gas nozzles depends upon the fluid-dynamic flow structure established within the cavity, so that their use tends to reduce operational flexibility and limit operation to a more restricted range of working conditions.

d) The state-of-the-art in SVR configurations employs a window. This has both advantages and disadvantages. It allows control of the atmosphere in the cavity, allows moderate pressurisation and avoids local pollutant emission by preventing the ingress and egress of gases and particles through it. It also reduces radiation losses, since it is opaque to the longer radiation wavelengths. A window also allows a certain amount of pressurisation, which has advantages for some applications. However, it is also usually expensive and limits the maximum size of the reactor, owing to the manufacturing constraints of producing large windows. In addition, it reduces the solar energy absorption efficiency, particularly in the case of any particle deposition, and is vulnerable to breakage. A window-less reactor, if available in a configuration that avoids significant ingress and egress, is likely to be the preferable alternative for a number of applications, although no window-less configurations has previously been proposed.

It is against this background, and the problems and difficulties associated therewith, that the present invention has been developed. While the present invention was developed against this background, it need not necessarily overcome any or all of the problems and difficulties referred to above. Rather, the invention may merely offer an alternative arrangement for exposing heat absorbing particles to concentrated solar radiation.

SUMMARY OF INVENTION

According to a first aspect of the invention there is provided a solar receiver comprising a chamber having an aperture through which concentrated solar radiation can be received within the chamber, an inlet means for introduction into the chamber of an inflow comprising solar absorbing particles, an outlet means for discharge of an outflow from the chamber, the inlet means communicating with the chamber for introduction of the inflow into a first section of the chamber in opposed relation the aperture, the outlet means communicating with a second section of the chamber disposed between the first section and the aperture, wherein fluid flow from the inlet means to the outlet means is exposed to concentrated solar radiation received within the chamber and wherein the flow establishes a flow field having a vortex structure, with the intensity of the vortex being greater in the first section of the chamber than in the second section of the chamber.

Typically, the intensity of the vortex is inversely related to the distance from the aperture.

With this arrangement, the flow field may promote aerodynamic classification to control residence time distribution of the particles within the chamber as a function of particle size, whereby the residence time of larger particles is increased in relation to that of small particles.

The vortex structure may be established by configuration of the chamber in conjunction with the manner of delivery of the inflow into the chamber, the arrangement serving to form a vortex flow that progresses towards the aperture along a generally helical path. A reverse flow is generated within the core region of the vortex.

In the region of the chamber within or adjacent to the first chamber section the vortex pattern may approach that of a forced vortex, and in the region of the chamber within or adjacent the second chamber section the vortex pattern may be that of a combined (free and forced) vortex.

Preferably, the chamber is so configured that said first section expands in a direction towards the aperture; that is, the first section is divergent in a direction towards the aperture.

Further, the inlet means may be configured to introduce the inflow tangentially into the divergent first section.

The inlet means may introduce the inflow into the divergent first section as a single flow stream or a plurality of flow streams. The inlet means may comprise one or more tangential inlets. Each inlet may have a discharge end opening onto the first section of the chamber in close proximity to an end thereof remote from the aperture.

The first section of the chamber may be defined by a wall of conical configuration, thereby providing the divergent configuration. Typically, the conical configuration is provided by the wall defining the first chamber section being of frusto-conical shape. In other words, the conical configuration would typically not converge to an apex, although it can do so.

Preferably, the chamber has a central longitudinal axis, and the conical wall defining the first chamber section is centred on the central longitudinal axis.

The conical wall defining the first chamber section may have a cone angle (being the angle defined between the conical wall and the central longitudinal axis) of any appropriate size. It is believed that cone angles in the range of about 15 degrees to 65 degrees are likely to be most suitable. More particularly, cone angles in the range of about 40 degrees to 65 degrees are believed to be likely to be advantageous, with an angle of about 45 considered to be optimal.

Decreasing the cone angle leads to a stronger reverse flow within the core region of the vortex. This can be conducive to recirculation within the proximity of the aperture.

The second section of the chamber may also is centred on the central longitudinal axis of the chamber.

The second section of the chamber is preferably circular is cross-section; that is, it is circular on a section normal to the central longitudinal axis of the chamber.

The second section of the chamber may, for example, be conical or cylindrical about the central longitudinal axis of the chamber.

In a case where the second chamber section is conical about the central longitudinal axis of the chamber, it may comprise a continuation of the conical first chamber section. In other words, the chamber may have a conical wall, with a first portion of the conical wall bounding the first chamber section and a second portion of the conical wall bounding the second chamber section.

In a case where the second chamber section is cylindrical about the central longitudinal axis of the chamber, it may be of a diameter equal to the diameter of the larger end of the frusto-conical wall defining the first chamber section.

The second chamber section may be contiguous with the first chamber section, whereby the adjacent ends of the two chamber sections have a common diameter.

The junction between the first and second chamber sections may define a circumferential edge in the chamber wall. The presence of the circumferential edge in the chamber wall may assist in the formation of the flow field having a vortex structure.

The aperture may be of circular configuration also centred on the central longitudinal axis of the chamber.

The aperture may have a window (such as a quartz window), although it need not necessarily do so as it may be an open aperture.

The aperture may be surrounded by a wall of the chamber.

In one arrangement, the chamber may comprise a front end and a rear end, the front end incorporating the aperture for receiving concentrated solar radiation. With this arrangement, the front end would define the wall of the chamber surrounding the aperture. The frusto-conical wall defining the first chamber section may extend from the rear end towards the front end. The chamber may further comprise a side extending between the front and rear ends, with the side providing the frusto-conical wall defining the first chamber section.

The inlet means may be incorporated in the rear end.

The outlet mean may open into the chamber at a location spaced from and in close proximity to the aperture. More particularly, the outlet mean may open into the chamber through a side thereof at a location spaced from and in close proximity to the aperture. Where the solar receiver is so configured and disposed that the aperture is uppermost, the outlet means may be positioned somewhat below the plane of the aperture. The outlet means may comprise a single outlet or a plurality of outlets. The outlet(s) may be disposed radially with respect to the chamber. In an embodiment, the outlet means may comprise two outlets disposed in diametrally opposed relation with respect to each other.

Where there is a plurality of outlets, it is desirable to have an even number of outlets, as this may ensure a symmetric vortex (being a vortex less prone to fluid dynamic instabilities).

Where there is a plurality of outlets, it is desirable that all outlets be positioned at the same plane, to establish a flow-field of the type discussed later.

The diameter of the outlet or each outlet, and its direction, influence the particle trajectories within the chamber. A preferential retention of the larger particles over the smaller ones is achieved by a) decreasing the diameter of the outlet(s) or b) increasing the angle of the outlet (s) relative to the tangential path of the flow. The use of a radial orientation enhances the retention of larger particles in comparison with a tangential outlet direction, so that the former can be considered typical of a useful angle. It is desirable that the areas of the inlet and outlet are chosen to achieve approximately the same inlet and outlet velocities, in order to avoid excessive high pressure drops while effectively retaining the larger particles over the smaller ones within the chamber. However, both of these parameters are a design variable, and the preferred angle may well be other than radial while the outlet size could be different from the one discussed above.

The solar absorbing particles are directly exposed to concentrated solar radiation within the chamber, which provides direct heating for efficient heat transfer to the particles.

The solar absorbing particles may comprise inert particles which can undergo sensible heating, or particles which can chemically react in response to heat from the solar radiation, or particles which can undergo both sensible heating and chemical reaction in response to heat from the solar radiation, or any mixture of the aforementioned particles.

Energy absorbed by the solar absorbing particles may be used to drive a reaction process. The solar receiver may thus provide a solar reactor.

For chemically reacting particles, the arrangement may permit particles to remain within the chamber until they are fully reacted and/or consumed. This may make it easier to achieve the complete chemical conversion of particles for a wide range of particles sizes. In this way, the solar-to-chemical efficiency of the reactor is improved in comparison with certain known prior art reactors.

Chemically reacting particles need not, however, be fully reacted and/or consumed. The particles may, for example, be only partly reacted and/or consumed prior to discharging from the chamber. In particular, the particles may be reacted and/or consumed to an extent to reduce them to a particle size conducive to discharge from the chamber.

The reactor may have improved capacity to process an inflow comprising a heterogeneous feedstock with varying particle sizes and compositions in comparison with certain known prior art reactors.

The reactor may have improved capacity to process an inflow comprising a lower-reactivity feedstock in comparison with certain known prior art reactors.

According to a second aspect of the invention there is provided a solar receiver comprising a chamber having an aperture through which concentrated solar radiation can be received within the chamber, an inlet means for introduction into the chamber of an inflow comprising solar absorbing particles, an outlet means for discharge of an outflow from the chamber, the inlet means communicating with the chamber for introduction of the inflow into a first section of the chamber in opposed relation the aperture, the outlet means communicating with a second section of the chamber disposed between the first section and the aperture, wherein fluid flow from the inlet means to the outlet means is exposed to concentrated solar radiation received within the chamber, the first section being divergent in a direction towards the aperture, the first section of the chamber being defined by a wall of conical configuration to thereby provide the divergent configuration, and the inlet means being configured to introduce the inflow tangentially into the divergent first section.

The solar receiver according to the second aspect of the invention may have any one or more of the features recited above in relation to the first aspect of the invention, either alone or in combination. In particular, the inlet means featured in the solar receiver according to the second aspect of the invention may introduce the inflow into the divergent first section as a single flow stream or a plurality of flow streams. Further, the conical configuration may be provided by the wall defining the first chamber section being of frusto-conical shape.

According to a third aspect of the invention there is provided a method of exposing heat absorbing particles to concentrated solar radiation using a solar receiver according to any one of the preceding aspects of the invention.

According to a fourth aspect of the invention there is provided a method of heating particles by exposure of the particles to concentrated solar radiation using a solar receiver according to any one of the preceding aspects of the invention.

According to a fifth aspect of the invention there is provided a method of heating particles through exposure of the particles to concentrated solar radiation, comprising the steps of: establishing a fluid flow comprising the particles; introducing the fluid flow into a solar receiver in which the particles are exposed to concentrated solar radiation entering the chamber through an aperture; the flow being introduced into a first section of the chamber remote from the aperture to establish a flow field having a vortex structure, with the intensity of the vortex being greater in the first section of the chamber than in a second section of the chamber closer to the aperture; wherein the flow field promotes aerodynamic classification to control residence time distribution of the particles within the chamber as a function of particle size, whereby the residence time of larger particles is increased in relation to that of small particles.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which:

FIG. 9 is a table presenting geometrical details of various configurations of the solar receiver according to the first embodiment;

FIG. 12 is a table presenting certain data relating to various configurations of the solar receiver according to the first embodiment.

In the drawings like structures are referred to by like numerals throughout the several views. The drawings shown are not necessarily to scale, with emphasis instead generally being placed upon illustrating the principles of the present invention.

Figure 1:
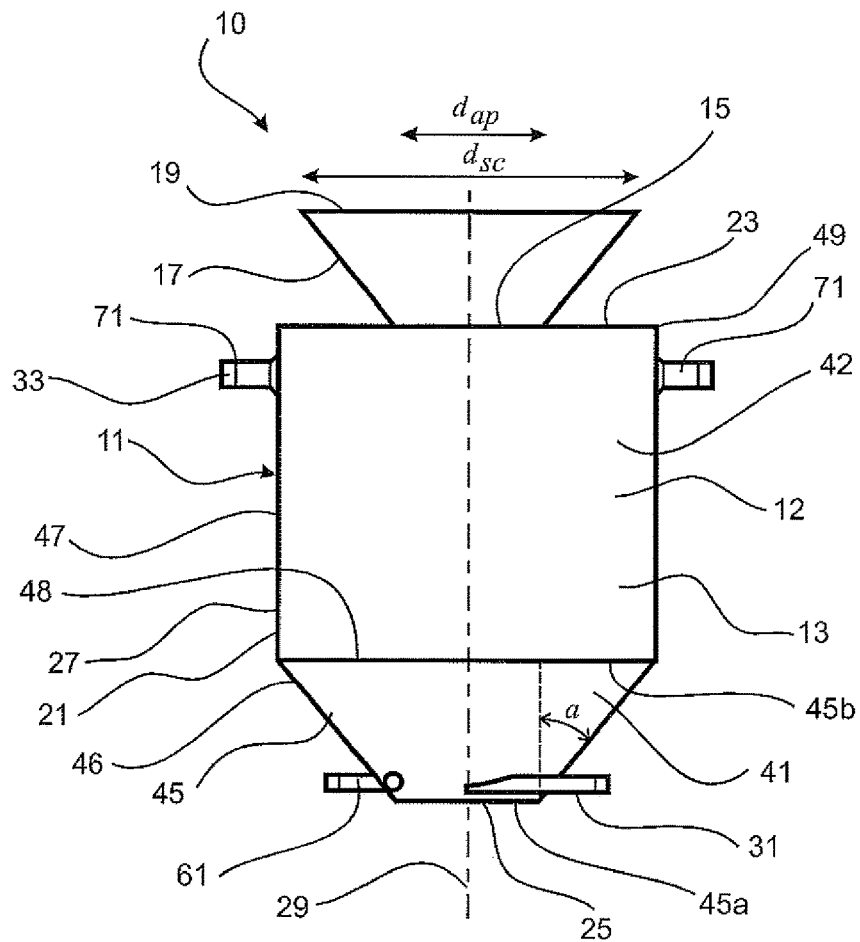
FIG. 1 is a schematic side view of a first embodiment of a solar receiver according to the invention.

The figures which constitute the drawings depict various embodiments of the invention. The embodiments illustrates certain configurations; however, it is to be appreciated that the invention can take the form of many configurations, as would be obvious to a person skilled in the art, whilst still embodying the present invention. These configurations are to be considered within the scope of this invention.

DESCRIPTION OF EMBODIMENTS

Broadly, the embodiments shown in the drawings are each directed to a solar receiver in which solar absorbing particles are directly exposed to concentrated solar radiation to absorb heat therefrom.

The solar receiver is arranged to capture heat energy from a solar source, as would be well understood by a person skilled in the art. The solar source may, for example, comprise a field of heliostats arranged to reflect sunlight towards the solar receiver. In such an arrangement, the solar receiver may be mounted to a tower above a heliostat field. However, parabolic dishes and other concentrating devices can alternatively be used.

The solar receiver may, for example, function as a solar reactor in which concentrated solar radiation is used as a source of high temperature process heat. Thermal energy absorbed by the particles is used to drive a reaction process performed within the solar reactor.

Several example embodiments of the invention will now be described in more detail.

Referring now to FIGS. 1 to 6, there is shown a first example embodiment of the solar receiver 10 according to the invention in a diagrammatic cross-sectional view. The solar receiver 10 comprises a vessel 11 defining a cavity 12 which provides a chamber 13 having an aperture 15 through which concentrated solar radiation can be received within the chamber 13. In the arrangement shown, the aperture 15 is fitted with a compound parabolic concentrator (CPC) 17 and a window 19 to reduce radiant losses from the chamber 13.

The vessel 11 comprises a housing 21 configured to define the chamber 13. The chamber 13 has a front end 23, a rear end 25, and a side 27 extending between the front and rear ends 23, 25. The aperture 15 is provided at the front end 23.

The chamber 13 has a central longitudinal axis 29, with the front and rear ends 23, 25 spaced axially along the central longitudinal axis 29 and disposed in opposed relation. The aperture 15 is circular and centred on the central longitudinal axis 29. The aperture 15 has a diameter $d_{ap}$.

The vessel 11 comprises an inlet means 31 for introduction of an inflow into the chamber 13, and an outlet means 33 for discharge of an outflow from the chamber 13. The inlet means 31 and outlet means 33 are located towards opposite ends of the chamber 13, and flow from the inlet means 31 to the outlet means 33 is exposed to concentrated solar radiation receivable within the chamber 13 through the aperture 15. The inlet means 31 and the outlet means 33 will be described in more detail later.

The inflow delivered into the chamber 13 via the inlet means 31 comprises solar absorbing particles entrained in a working fluid. The nature of the solar absorbing particles may vary according to the particular application of the solar receiver 10, as would be understood by a person skilled in the art. In certain applications of the solar receiver 10, the solar absorbing particles may, for example, comprise inert particles which can undergo sensible heating without any thermal decomposition; that is, the solar absorbing particles merely function as heat absorbers and carriers, and they do not undergo any change of state or thermal decomposition. In certain other applications of the solar receiver 10, the solar absorbing particles may, for example, chemically react in response to heat from the solar radiation. In still other applications of the solar receiver 10, the solar absorbing particles may, for example, undergo both sensible heating and chemical reaction in response to heat from the solar radiation. In yet other applications of the solar receiver 10, there may be a mixture of solar absorbing particles, some of which are inert particles to undergo sensible heating without any thermal decomposition, and others of which are chemically reactive in response to heat from the solar radiation.

In one particular application of the solar receiver 10, the solar absorbing particles may comprise feedstock intended to be heated or processed in the solar receiver 10. By way of example, in a circumstance in which the solar receiver 10 is arranged to serve as a solar reactor, the solar absorbing particles may comprise particles intended to undergo a chemical reaction, with concentrated solar energy absorbed by the particles providing the necessary heat to drive the reaction process. For gasification, the feedstock may comprise a carbonaceous feedstock, and the working fluid may comprise steam, with the feedstock undergoing thermal decomposition in the reactor. In such an example, the carbonaceous feedstock may comprise spherical carbon particles of a size in in the range of about 1-1000 μm, and the working fluid may comprise steam at a temperature of about 1000K.

The nature of the outflow discharging from the chamber 13 via the outlet means 33 may vary according to the particular application of the solar receiver 10, as would be understood by a person skilled in the art. By way of example, in an arrangement where the solar absorbing particles comprise inert particles intended to undergo sensible heating without any thermal decomposition, the outflow may comprise the particles heated by the concentrated solar radiation to which they were exposed within the chamber 13, together with the working fluid in which the particles are entrained. Further, in an arrangement where the solar absorbing particles comprise particles which are chemically reactive in response to heat from the solar radiation, the outflow may comprise the chemical products of the reaction process. The particles may be consumed entirely or only partly by the reaction process. In the latter case, the partly-consumed particles would be smaller in particle size than their original state.

The chamber 13 is so configured that, in conjunction with the manner in which the inflow is delivered via the inlet means 31 into the chamber 13, it forms a vortex flow that progresses towards the aperture 15 along a generally helical path. The vortex flow creates a vortex structure in the flow from the inlet means 31 to the outlet means 33, the vortex structure being illustrated schematically in FIG. 3 and denoted by reference numeral 35. A reverse flow is generated within the core region of the vortex, as also illustrated schematically in FIG. 3 and denoted by reference numeral 37.

In particular, the chamber 13 is configured to comprise a first section 41, with which the inlet means 31 communicates, whereby the inflow is delivered into the first section 41 tangentially to form the vortex structure 35, as will be described in more detail later. The chamber 13 further comprises a second section 42, with which the outlet means 33 communicates for discharge of the outflow from the chamber.

The first section 41 of the chamber 13 is divergent in a direction towards the aperture 15 to facilitate formation of the vortex structure 35. Specifically, the first section 41 of the chamber 13 is defined by a wall 45 of conical configuration to thereby provide the divergent configuration. The wall 45 defines a portion of the chamber side 27.

The conical configuration of the wall 45 defining the first chamber section 41 is, more particularly, frusto-conical in shape, having a smaller diameter end 45a and a larger diameter end 45b. The smaller diameter end 45a is adjacent the rear end 25 of the chamber 13, as shown in the drawings. The wall 45 will hereinafter be referred to as the conical wall.

The conical wall 45 cooperates with the rear end 25 to effectively provide the chamber 13 with a conical base 46.

The conical wall 45 defining the first section 31 has a cone angle α, being the angle defined between the conical wall 45 and the central longitudinal axis 29, as depicted in FIG. 1. In the arrangement illustrated, the cone angle α is 45 degrees, which is believed to be optimal for the present embodiment. However, other cone angles can be adopted. It is believed that cone angles α in the range of about 15 degrees to 65 degrees are likely to be particularly suitable, with cone angles in the range of about 40 degrees to 65 degrees likely to be advantageous.

Decreasing the cone angle α leads to a stronger reverse flow 37 within the core region of the vortex structure 35. This can be conducive to recirculation within the proximity of the aperture 15. Absence of recirculation within the proximity of the aperture 15 may be advantageous in circumstances where the aperture 15 has a window (such as a quartz window), as it may reduce the propensity for particle disposition on the window. This can also be advantageous in circumstances where the aperture does not have a window, as absence of recirculation may contribute to a reduction in, or avoidance of, connective heat loss and particle leakage through the open aperture.

The second section 42 of the chamber 13 is also centred on the central longitudinal axis 29. The second section 42 is circular is cross-section; that is, it is circular on a section normal to the central longitudinal axis 29.

In this embodiment, the second section 42 of the chamber 13 is of a configuration which is cylindrical. With this arrangement, the second section 42 of the chamber has a cylindrical wall 47. The cylindrical wall 47 defines a further portion of the chamber side 27. Other configurations of the second section 42 may also be used, including for example a conical configuration (as used in the second embodiment which will be described later).

The cylindrical wall 47 of a diameter equal to the diameter of the larger end 45b of the frusto-conical wall 45 defining the first chamber section 41.

The second chamber section 42 is contiguous with the first chamber section 41, whereby the adjacent ends of the two chamber sections have a common diameter, corresponding to the diameter of the cylindrical wall 47 and the diameter of the larger end 45b of the frusto-conical wall 45. This diameter represents the reactor diameter $D_c$.

The junction between the first and second chamber sections 41, 42 defines a circumferential edge or corner 48 in the side 27 of the chamber. Further, the junction between the side 27 and the front end 23 of the chamber 13 defines a further circumferential edge or corner 49 in the chamber 13. The presence of the circumferential edges or corners 48, 49 in the chamber 13 assists in the formation of the flow field having the vortex structure 35, as will be explained later.

Figure 2:
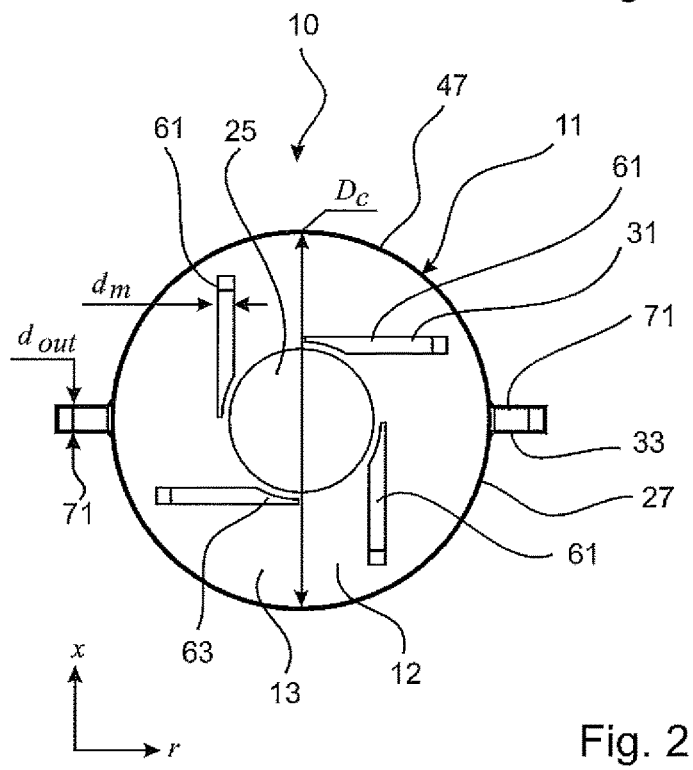
FIG. 2 is a schematic underside view of the arrangement shown in FIG. 1.
Figure 3:
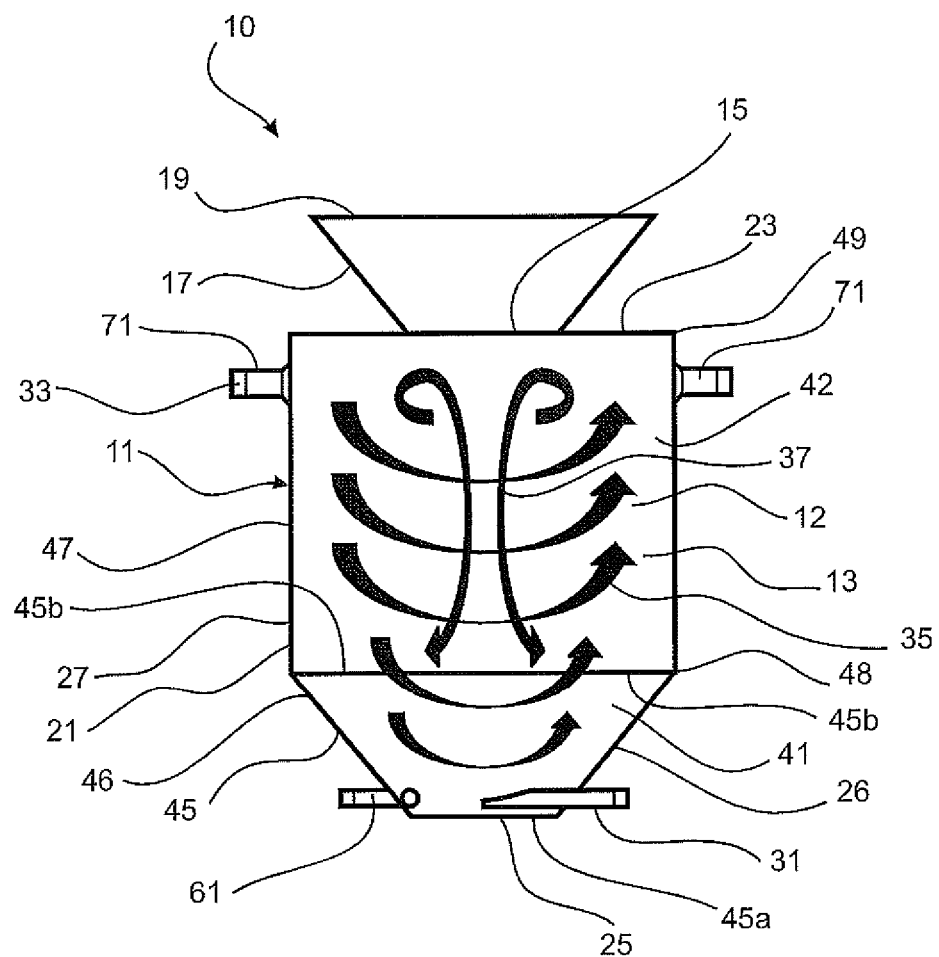
FIG. 3 is a schematic side view of solar receiver, featuring a simplified representation of a three dimensional flow field within the chamber of the solar receiver.
Figure 4:
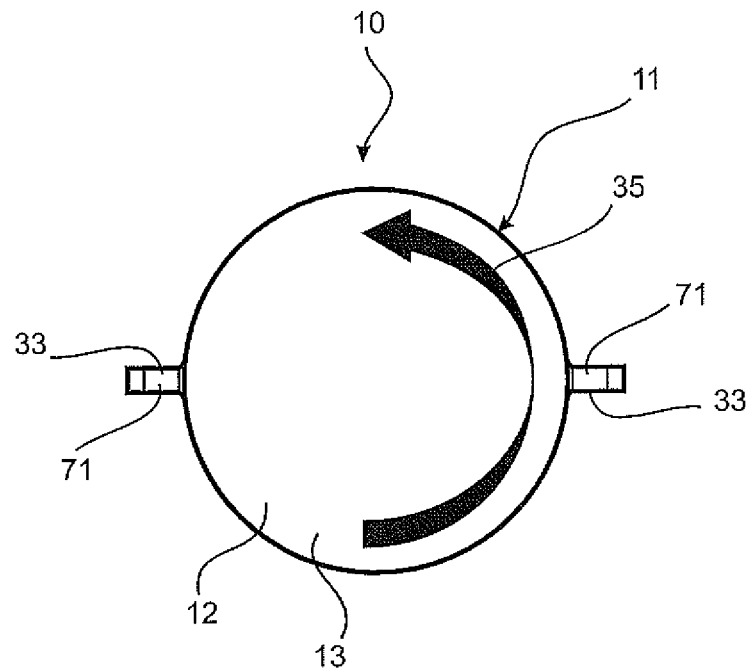
FIG. 4 is a schematic plan view of the arrangement shown in FIG. 3.

As mentioned above, the inlet means 31 is arranged to introduce the inflow tangentially into the divergent first section 31 to facilitate formation of the vortex structure 35. In this embodiment, the inlet means 31 is arranged to introduce the inflow into the chamber 13 as a plurality of flow streams. For this purpose, the inlet means 31 comprises a plurality of tangential inlets 61, there being four inlets in the arrangement shown. Each inlet 61 has a discharge end 63 opening onto the first section 31 of the chamber in close proximity to the rear end 25, as best seen in FIG. 2. The discharge end 63 is profiled to conform generally with the adjacent arcuate portion of the conical wall 45, also as best seen in FIG. 2, to assist the inflowing stream to form the flow field having the vortex structure 35. In this embodiment, each inlet 61 comprises an inlet pipe. The inlet means 31 need not necessarily comprise a plurality of inlets 61, and may for example comprise a single inlet.

In this embodiment, the outlet means 33 comprises two outlets 71 disposed radially with respect to the chamber 13 in close proximity to the aperture 15, as shown in FIGS. 1 to 4 (although not necessarily in other figures). The use of a radial orientation enhances the retention of larger particles in comparison with a tangential outlet direction. The two outlets 71 are in diametrally opposed relation with respect to each other. The outlet means 33 need not necessarily comprise a plurality of outlets 71, and may for example comprise a single outlet.

In this embodiment, each outlet 71 comprises an outlet pipe. The diameter of each outlet pipe, and its direction, influence the particle trajectories within the chamber 13. A preferential retention of the larger particles over the smaller ones is achieved by a) decreasing the diameter of the outlet pipe, or b) increasing the angle of the outlet (s) 71 relative to the tangential path of the flow. The use of a radial orientation enhances the retention of larger particles in comparison with a tangential outlet direction, as mentioned above, so that the former can be considered typical of a useful angle.

It is desirable that the cross-section flow areas of the inlet means 31 and outlet means 33 are chosen to achieve approximately the same inlet and outlet velocities, in order to avoid excessive high pressure drops while effectively retaining the larger particles over the smaller ones within the chamber 13. However, both of these parameters are a design variable. For instance, the preferred angle may well be other than radial while the outlet size could be different from the one discussed above.

Because the inlet means 31 is located at the opposite end of the chamber 31 to the aperture 15, and because of the chamber 13 is so configured to provide the divergent first section 41 into which the inflow is delivered tangentially via the inlet means 31, the vortex structure 35 so formed is much weaker in the region of the chamber 13 immediately adjacent the front end 23 and the aperture 15. This reduces axial transport of particles through the aperture 15 along the vortex core.

Further, because the inlet means 31 is located at the opposite end of the chamber 31 to the aperture 15, and because of presence of the conical base 46 of the chamber 13, a central recirculation zone is formed within the vortex structure 35 which generates the reverse flow 37. This reverse flow 37 drives particles away from the aperture 15 rather than towards it.

Finally, the vortex structure 35 has a vortex pattern approaching that of a forced vortex in the region of the chamber 13 within or adjacent the first chamber section 41, and a vortex pattern that approaches a combined (free and forced) vortex in the region of the chamber within or adjacent the second chamber section 42.

The diameter $d_{ap}$ of the aperture 15 is required to be smaller than the diameter of the core of the vortex structure 35 at the plane of the aperture to inhibit the transport of particles through the aperture. The cone angle α influences the diameter and the intensity of the vortex structure 35 at the plane of the aperture 15. For a fixed cone angle, a value of the aperture diameter to the reactor diameter ratio ($d_{ap}/D_c$) in the range of about 0.125 to 0.25 is desirable to reduce the particle deposition.

As mentioned above, cone angles α in the range of about 40 degrees to 65 degrees likely to be advantageous. A cone angle value within is range promotes recirculation of larger particles an d achieves a reduction in particles deposition on the window, as well as reducing the propensity for particles to settle onto the conical wall 45 of the first section 41 of the chamber 13.

The vessel 11 may be mounted in any orientation, so long as concentrated solar radiation can be directed into the chamber 13 through the aperture 15. It is, however, advantageous to mount the vessel 11 in an orientation with the central longitudinal axis 29 of the chamber 13 generally vertical and the aperture 15 uppermost, as it can utilise the effect of gravity. It also facilitates a beam-down configuration for delivery of the concentrated solar radiation to the chamber 13 through the aperture 15.

In particular, the use of gravity, together with the positioning of the conical base 46 of the chamber lowermost, provides a configuration that retains the larger particles in the chamber 13 for longer periods than the smaller particles. In addition, the beam-down configuration offers various advantages, such as the ability to mount the receiver 10 on the ground and to harvest the radiation from a surrounding field of heliostats. An orientation in which the conical base 26 is at the bottom of the chamber enhances the recirculation of the larger particles within the cavity and increases their residence time there. The downward configuration also facilitates enclosing at least part, and possibly all, of the solar receiver 10 within a support structure such as a tower, to increase the shielding of the solar receiver from wind as a further means to avoid convective losses and/or fully control any effects of small quantities of particle egress in the case of a windowless receiver.

Figure 5:
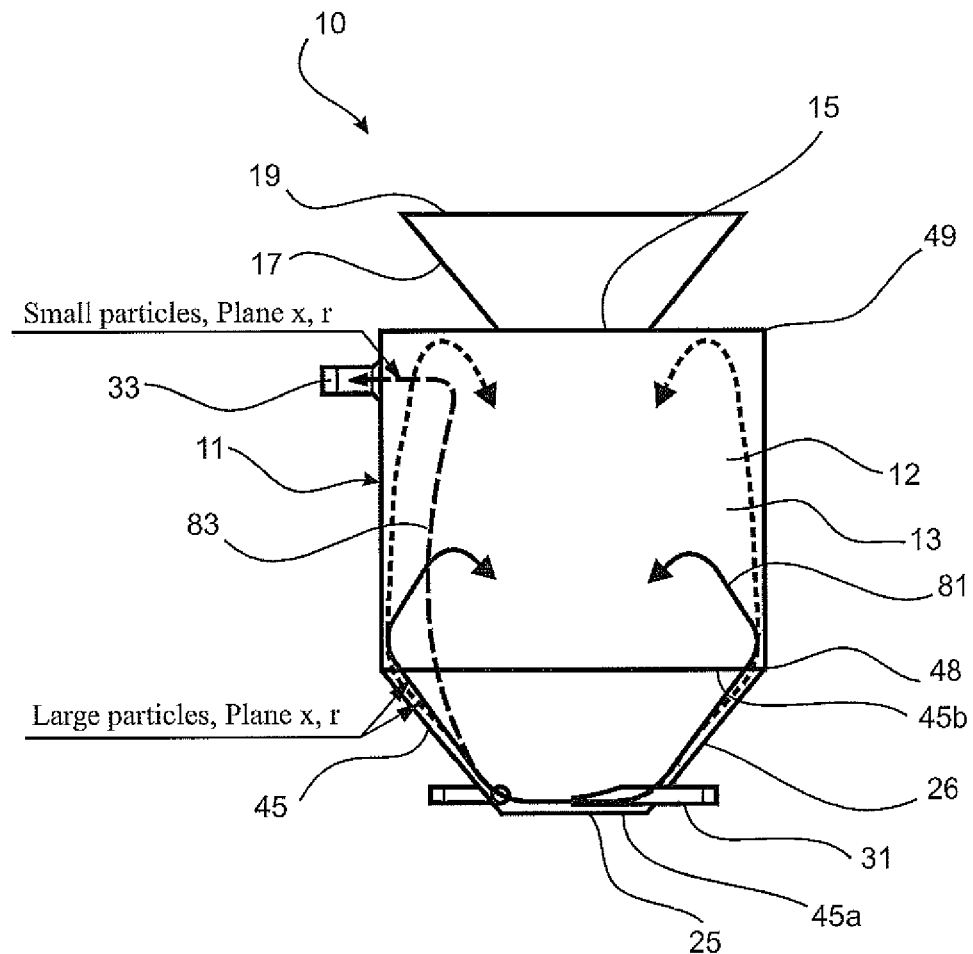
FIG. 5 is a view similar to FIG. 1, except that the axial components of the dominant deduced particle trajectories are also depicted.
Figure 6:
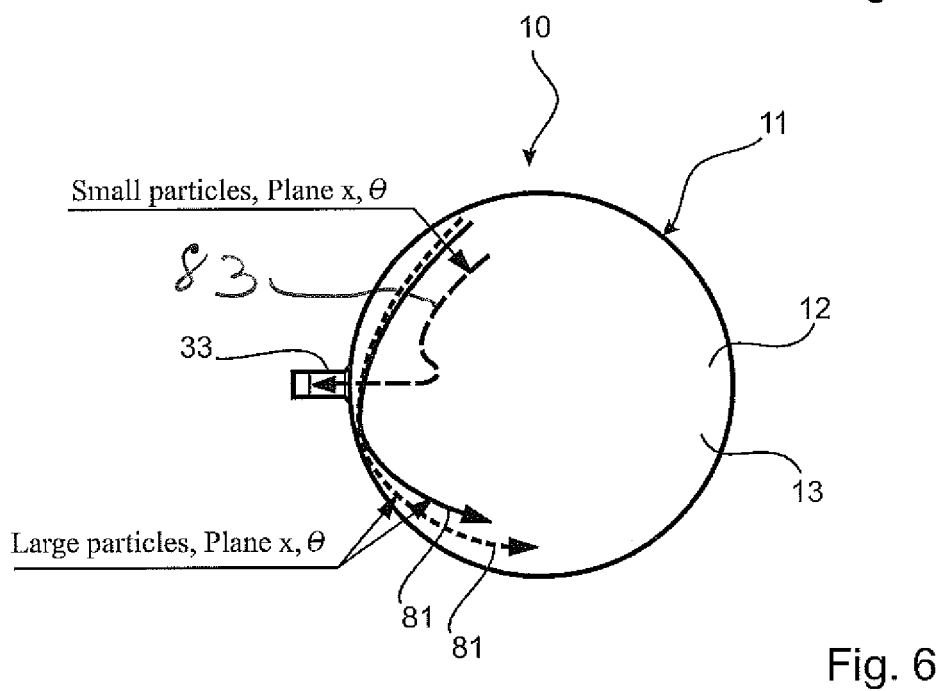
FIG. 6 is a view similar to FIG. 2, except that the tangential and radial components of the dominant deduced particle trajectories at the exit plane are also depicted.

FIGS. 5 and 6 illustrate schematically mechanisms by which the larger particles are retained within the chamber 13 while the smaller ones are removed from it. In the drawings, typical flow paths for larger particles are depicted by flow lines which are identified by reference numeral 81, and typical flow paths for smaller particles are depicted by flow lines which are identified by reference numeral 83.

As depicted, the small particles follow the gas flow path while the larger particles deviate from the streamlines. While both the large and small particles are directed toward the side 27 by their inertia, the larger particles are directed toward the centre of the chamber 13 when they interact with the edges or corners 48, 49, both at the end of the conical wall 45 and at the front end 27 of the chamber. In addition, the large particles are unable to follow the large gradients in the mean flow that occur at the outlet means 33, so that they are retained within the chamber 13. The conical wall 45 also reduces the propensity of the largest particles to settle onto the surface of the conical wall 45 as the flow velocity reduces the axial distance, which would become increasing likely for the horizontal orientation as the cone angle is increased toward 90°. In addition, positioning the outlet means 33 below the aperture 15 and in the radial direction inhibits the large particles from leaving the chamber 13 relative to the small particles. Finally, locating the inlet means 31 at the opposite end of the chamber 13 to the aperture 15 leads to a less intense vortex within the chamber. This will lead to a greater propensity for the larger particles to fall below the settling velocity and return to the bottom of the chamber 13, especially for the case where the chamber is aligned vertically. FIG. 5 also shows that the orientation of the inlet 31 at the opposite end of the chamber 13 to the aperture 15 causes the well-known Central Recirculation Zone in a swirling flow.

The foregoing description of the solar receiver 10 according to the first embodiment is not intended to be exhaustive or to be limited to the precise forms disclosed.

With a view to providing further information in relation to the solar receiver 10 according to the first embodiment, further description is provided below with reference to FIGS. 7 to 12 of the drawings. The further description provided further detail on the vortex structure and provides an analysis of particle deposition. The further description is provided to further explain how to fashion and use the embodiment, and also to further explain operation of the embodiment in accordance with the technology of the invention, rather than to limit the true, intended, and fair scope and spirit thereof. There is some redundancy in the following description and also FIGS. 7 to 12, when considered with respect to the foregoing description of the first embodiment.

In the description below, the solar receiver 10 according to the first embodiment is referred to by the acronym SEVR, which stands for Solar Expanding-Vortex Flow Receiver/Reactor.

Further, in the description below, there is reference to a prior art solar receiver/reactor which is referred to as "Z'Graggen". The Z'Graggen solar receiver/reactor which is of the type disclosed in U.S. Pat. Nos. 7,449,158 and 8,257,454.

The shape of the SEVR has been determined by the use of validated computational fluid-dynamics (CFD) models with commercial ANSYS software. Its performance has also been determined by CFD analysis, using a particle dispersion model whose viability has been demonstrated previously in the scientific literature. This analysis has been performed to calculate the particle residence time distribution (RTD), the particle trajectories and to characterise the vortex structure within the reactor cavity. The analysis has also been used to develop the design criteria by which RTD can be controlled and by which particle deposition can be avoided, through correlating reactor performance with both flow and geometrical parameters.

In addition to the CFD analysis, a laboratory-scale SEVR has been built and tested to investigate the flow field within the cavity and the particle deposition onto the window. It has been proved that the SEVR can be configured to greatly mitigate the particle deposition onto the receiver/reactor window without the use of sealing gas to shield the window due to the peculiar flow field, confirming the prediction of the CFD model developed.

Figure 7B:
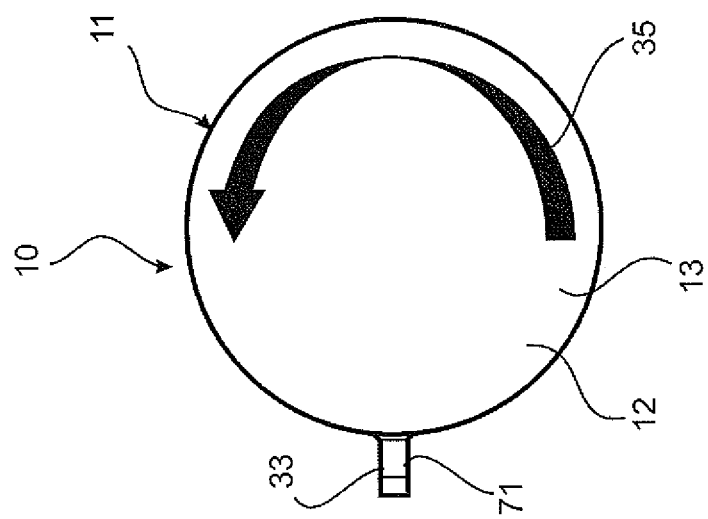
FIG. 7 comprises various views which together provide a simplified representation of the three dimensional flow field within the chamber of the solar receiver, together with the key features of the deduced particle trajectories.
Figure 7A:
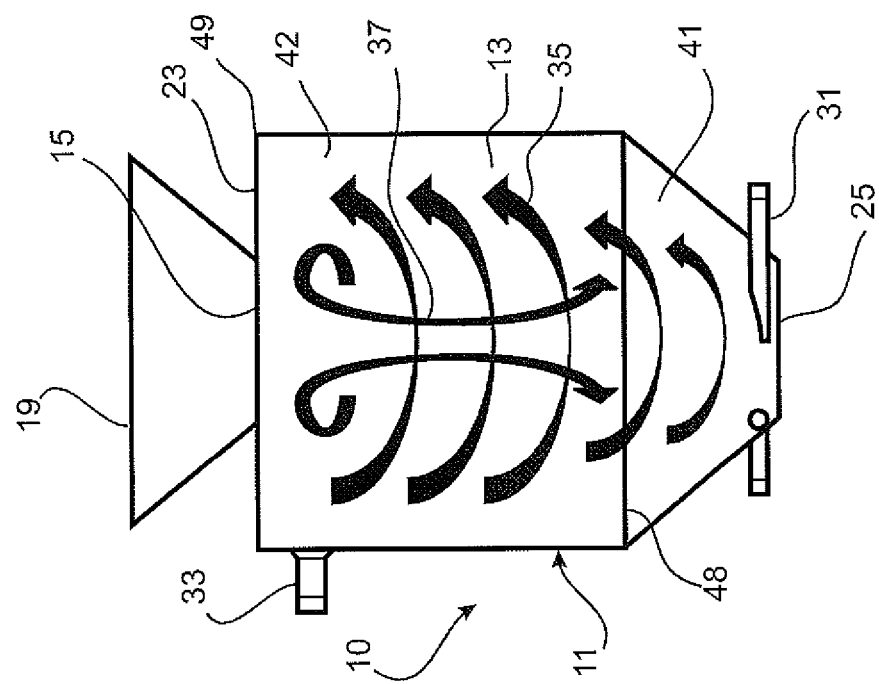

FIG. 7(a) to (d) together present a schematic diagram of the dominant deduced particle trajectories within the SEVR, based on the CFD analysis. FIG. 7 corresponds to FIGS. 3 to 6. It can be seen that small particles follow the gas flow path while the larger particles deviate from the streamlines. While both the large and small particles are directed toward the wall defined by side 27 under the influence of their inertia, the larger particles are directed toward the centre of the chamber 13 when they interact with the corners 48, 49, both at the end of the conical section 31 and at the top of the chamber 13. In addition, the large particles are unable to follow the large gradients in the mean flow that occur at the exit defined by outlet means 33, so that they are retained within the chamber. The conical section 31 also reduces the propensity of the largest particles to settle onto the walls of the expansion as the flow velocity reduces with axial distance, which would become increasing likely for the horizontal orientation as the cone angle is increased toward 90°. In addition, positioning the outlet means 33 below the aperture 15 and in the radial direction inhibits the large particles from leaving the chamber relative to the small particles. Finally, locating the inlet means 31 at the opposite end of the chamber 13 to the aperture 15 leads to a less intense vortex within the chamber. This will lead to a greater propensity for the larger particles to fall below the settling velocity and return to the bottom of the chamber, especially for the case where the chamber is aligned vertically. FIG. 7(a) also shows that the orientation of the inlet defined by the inlet means 31 at the opposite end of the chamber 13 to the aperture 15 causes the well-known Central Recirculation Zone in a swirling flow to drive the recirculated particles away from the aperture 15, rather than toward it for the original SVR configuration.

Figure 8:
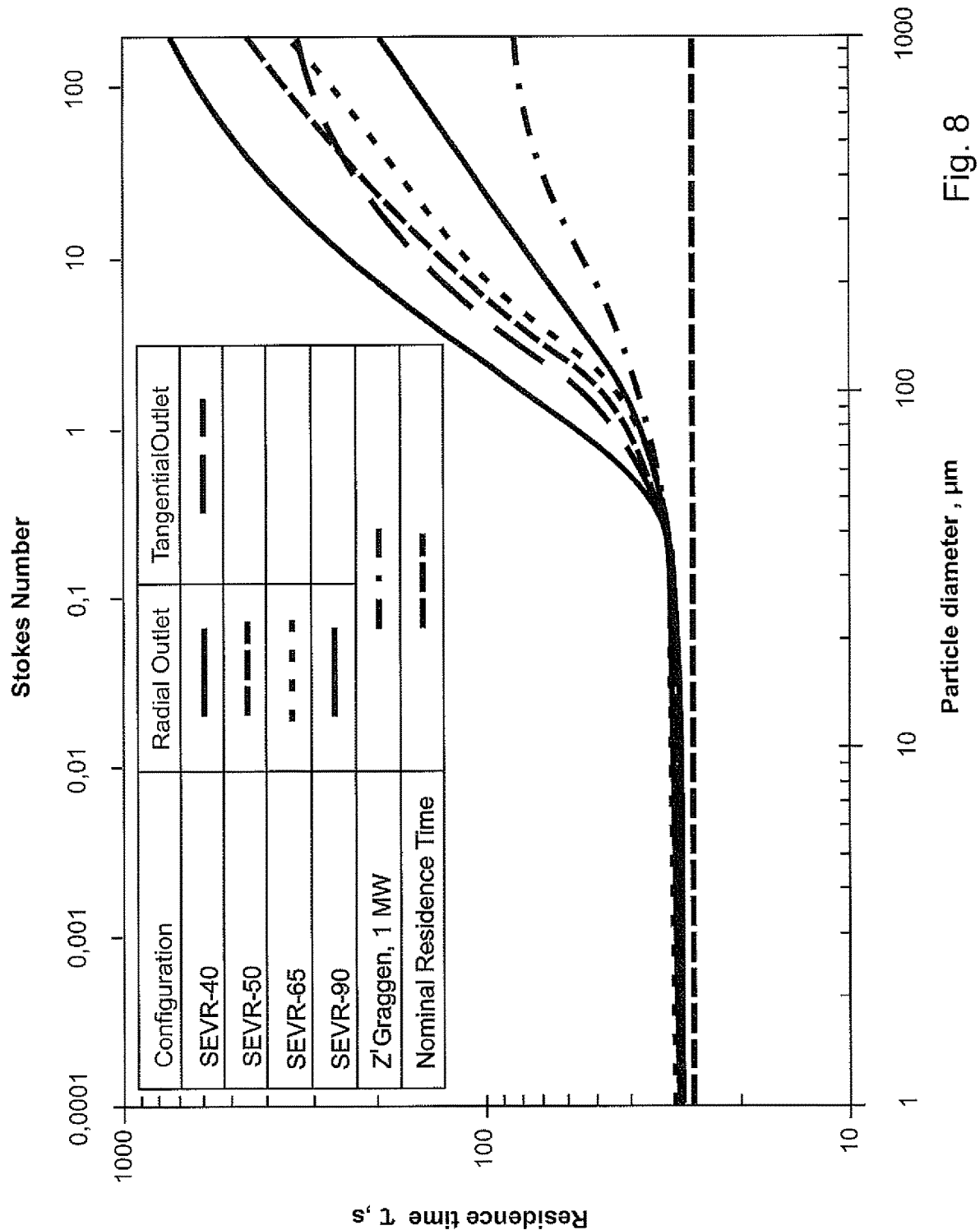
FIG. 8 depicts graphically data relating to mean particle residence time in various configurations of the solar receiver according to the first embodiment, as well corresponding data for a prior art solar receiver, together with the nominal reactor residence time of the solar receiver according to the first embodiment.
Figure 10:
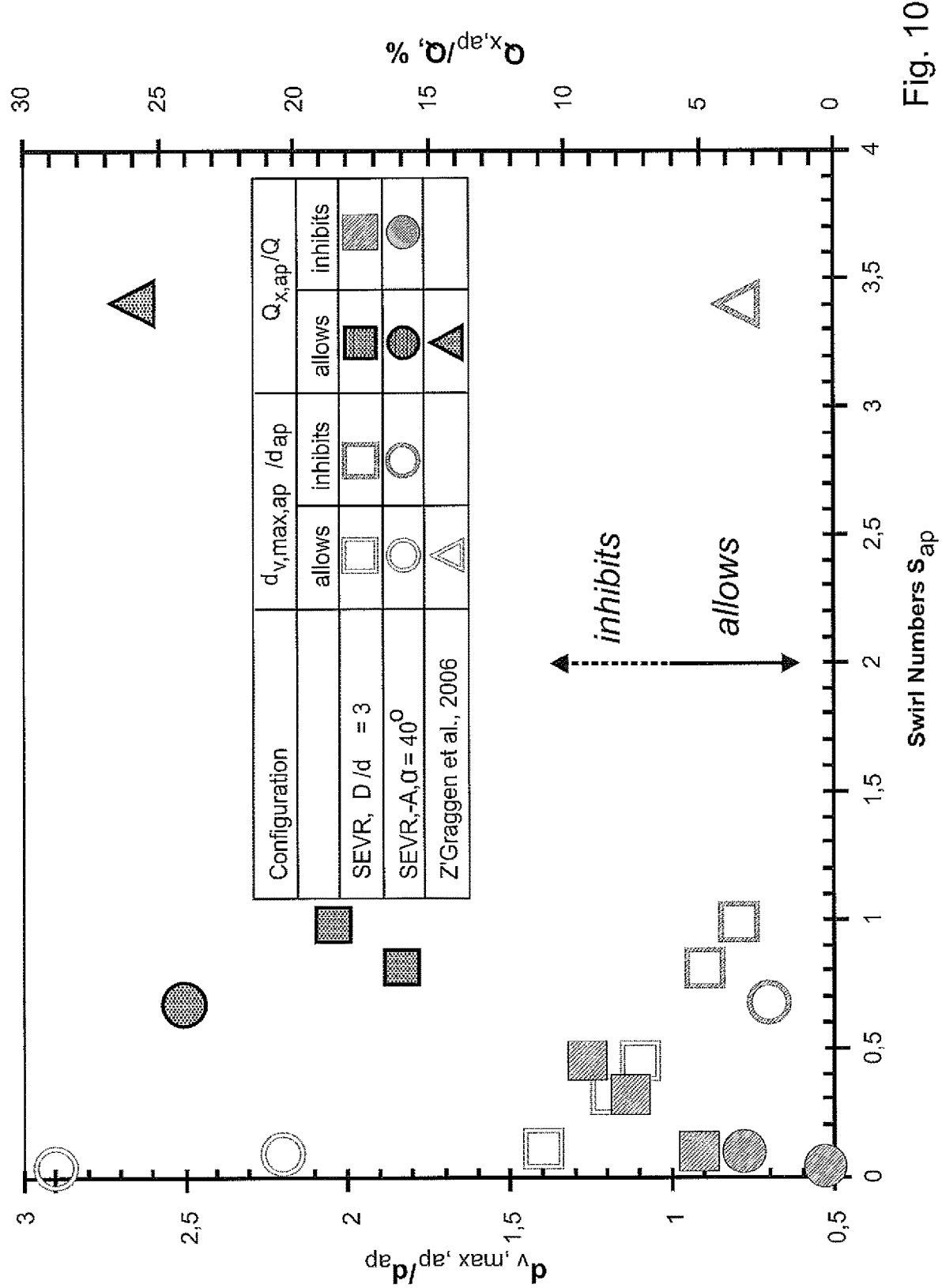
FIG. 10 depicts graphically certain data relating to various configurations of the solar receiver according to the first embodiment, as well corresponding data for a prior art solar receiver.
Figure 11:
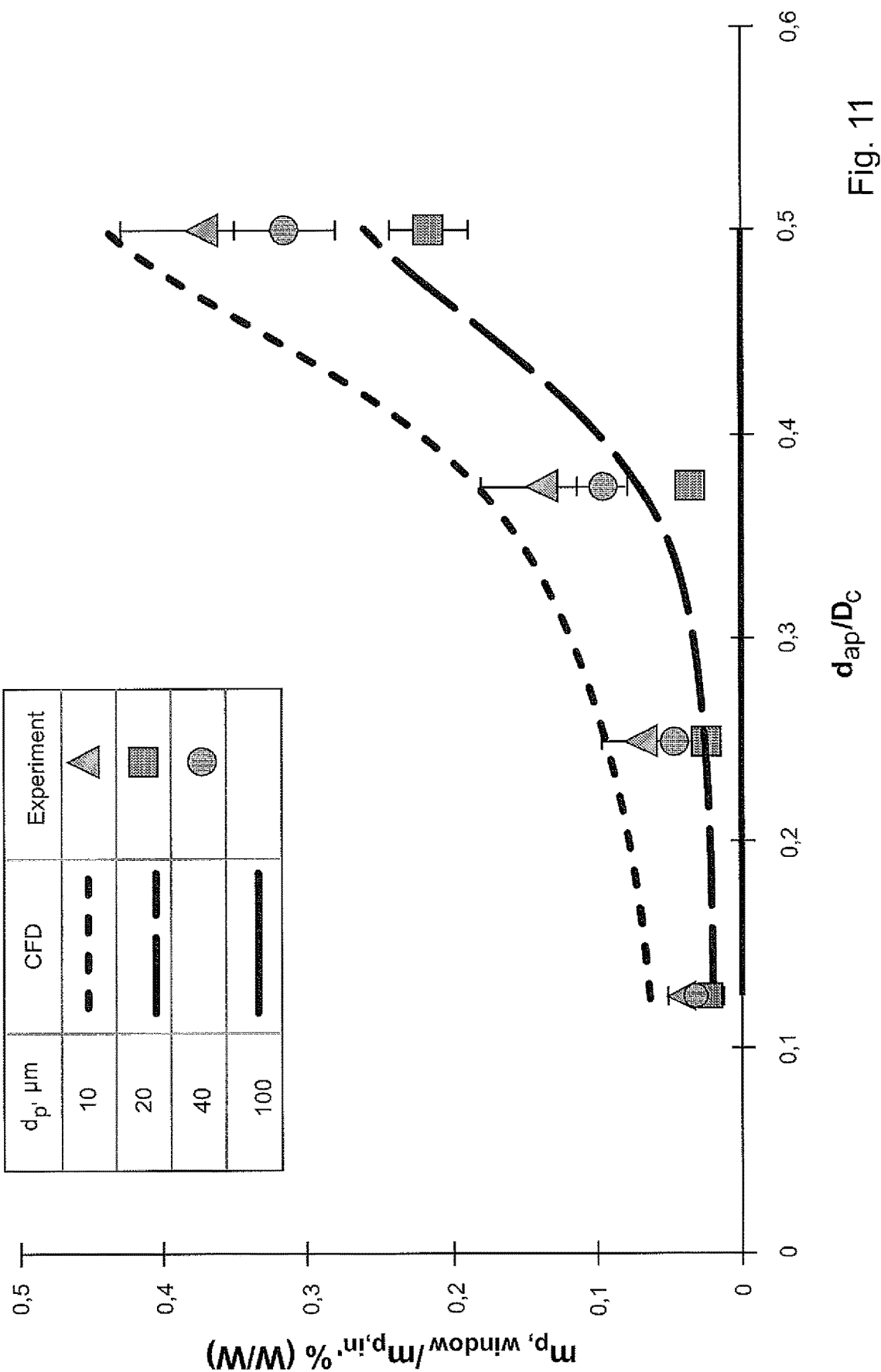
FIG. 11 depicts graphically certain data relating to the solar receiver according to the first embodiment.
Figure 13:
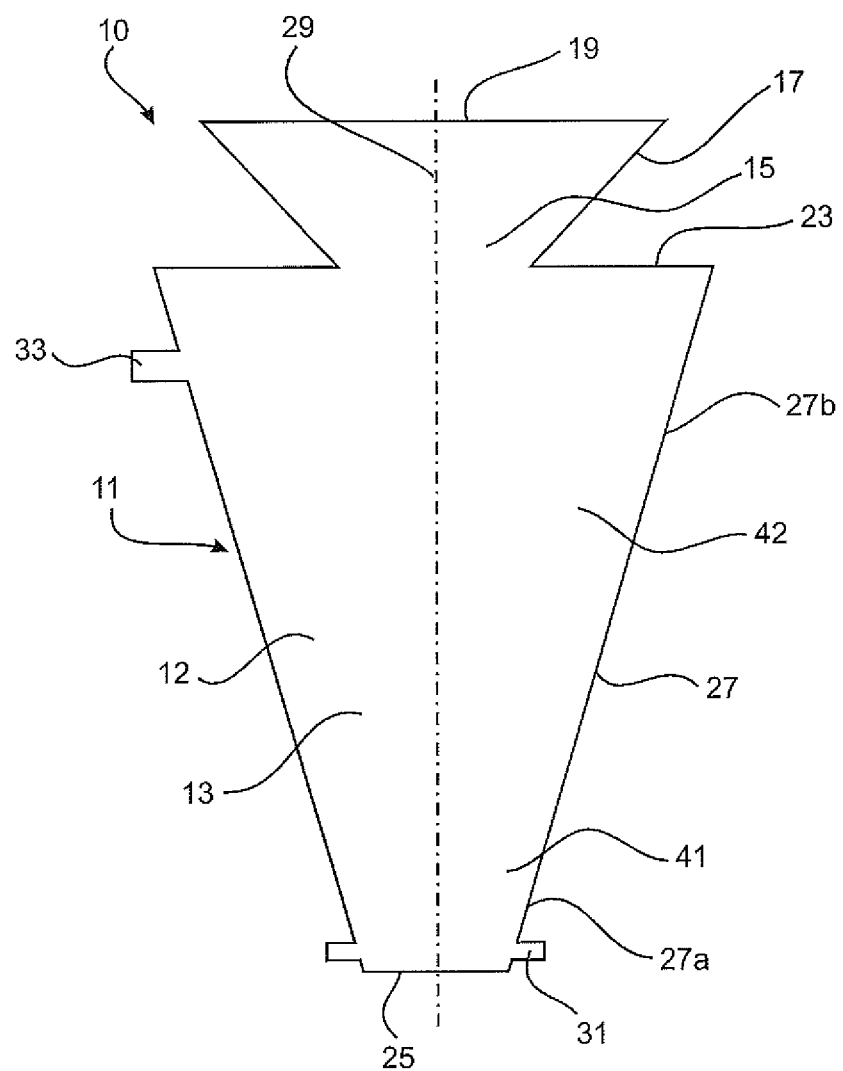
FIG. 13 is a schematic side view of a second embodiment of a solar receiver according to the invention.

FIG. 8 presents the mean residence times for three different configurations (SEVR-40, SEVR-50 and SEVR-65), varying the particle sizes, $d_p$, in the range 1-1000 μm. The SEVR-40, SEVR-50 and SEVR-65 configurations refer to a value of the cone angle, α, of 40, 50 and 65, respectively. The geometrical details of all the configurations investigated are presented in FIG. 9 as Table 1.

FIG. 8 also reports the nominal reactor residence time (V/Q) and the calculated mean residence time for the prior art SVR configuration, termed the 'Z'Graggen, 1MW' configuration.

It can be seen that for the proposed configurations, the residence times of larger particles are higher than those calculated for 'Z'Graggen, 1MW' configuration and this difference increases with the particle size. For instance, the calculated mean particle residence times for the configuration SEVR-40 are 2 and 9 times greater than those calculated for 'Z'Graggen, 1MW' configuration for $d_p$=100 μm and $d_p$=1000 μm, respectively. This trend leads to the conclusion that the cone can be used to generate inertial flows with sufficiently strong gradients for the larger particles to be unable to follow and so to be preferentially retained within the cavity relative to the smaller particles. The conical base to the cylindrical chamber also funnels any recirculated particles back to the vortex core at the base of the chamber to be re-entrained into the high velocity flow and recirculated. FIG. 8 also shows that a decrease in α leads to an increase in the residence time of the larger particles in the chamber.

The SEVR differs from the Z'Graggen configuration not only by the addition of a conical base, but also by the outlet being oriented in the radial direction and located below the plane of the aperture. The inlet to the reactor is also positioned at the opposite end of the chamber to the aperture, as has already been described. Each of these factors contributes to the increased residence time of the larger particles. To quantify separately their contribution to the residence time of larger particles, calculations were carried out for a SEVR configuration with a cylindrical shape (SEVR-90) and for the SEVR-40 configuration with a tangential outlet (SEVR-40, tangential outlet). The calculated particle mean residence time is reported for these two configurations in FIG. 8. This shows that τ of larger particles for the SEVR-40 with tangential outlet is lower in comparison with those calculated for the original SEVR configuration, indicating that both the radial orientation of the outlet and its positioning below the aperture plane enhance the recirculation of larger particles into the chamber. These calculations also show that for the cylindrical cavity (SEVR-90), τ of larger particles decrease drastically, as these tend to settle onto the walls instead of recirculating within the chamber. This result highlights further the key role of the conical base in the mechanism with which larger particles are preferentially recirculated within the SEVR. Finally, although the use of a cylindrical cavity significantly decreases $\tau$ for the larger particles, the SEVR-90 is characterised by a larger $\tau$ for the larger particles in comparison with those calculated for the Z'Graggen configuration. This provides further evidence that the choice of positioning the inlet of the reactor at the opposite end of the chamber to the aperture also has a beneficial effect in retaining larger particles within the cavity.

FIG. 10 presents the calculated diameter of the vortex core at the aperture plane relative to the aperture diameter, $d_{vmax,ap}/d_{ap}$, as a function of the Swirl number at the plane of the aperture, $S_{ap}$, for several reactor configurations. In one parametric investigation, the aperture size was fixed at $D_c/d_{ap}=3$, while the cone angle was varied (SEVR-15, SEVR-30, SEVR-40, SEVR-50 and SEVR-65). In another parametric investigation, the cone angle was fixed at $\alpha=40°$, while the diameter of the aperture was varied (SEVR-A600, SEVR-A200 and SEVR-A150). All the geometrical details of these configurations can be found in Table 1 (FIG. 9). In all cases the chamber length, L and the input flow conditions were fixed. The value of $d_{vmax,ap}$ was calculated considering the locus of the maxima of tangential velocity at the plane immediately below the aperture. FIG. 10 also presents the variation in the ratio of the volumetric flow rate from the reactor cavity through the aperture relative to the total inlet flow rate, $Q_{xap}/Q$, as function of $S_{ap}$. The calculated performance of the configuration of Z'Graggen et al. (2006) is also reported for reference. It can be seen that for a fixed $D_c/d_{ap}$, an increase in a leads to decrease of $S_{ap}$ and $Q_{xap}/Q$, and to an increase of the diameter of the vortex core at the aperture plane. In particular, for $\alpha\geq40°$, $d_{vmax,ap}/d_{ap}$ is greater than 1. For this condition, the fluid flow through the aperture is low and the intensity of the vortex at the plane of the aperture is calculated to be insufficient to propel particles through the aperture. A visualisation of the modelled particle tracks (not reported) for configurations with $\alpha\geq40°$ showed that none of the modelled particles tracks are calculated to penetrate into the "chamber" bounding the SC above the aperture, providing strong evidence that configurations characterised by $d_{vmax,ap}/d_{ap}>1$ and small $S_{ap}$ offer the potential to mitigate the particle deposition onto the reactor window. In contrast, for $\alpha<40°$, $d_{vmax,ap}/d_{ap}<1$. This condition indicates that the intensity of the vortex at the aperture plane is strong, which can be expected to lead to strong recirculation of the fluid flow from the reactor through the aperture, implying a strong propensity to particle deposition onto a window, consistent with the particle tracks revealed by the visualisation.

It can be seen that fixing $\alpha=40°$ and varying $d_{ap}$ (configurations SEVR-A600, SEVR-A200 and SEVR-A150), leads to a variation of $S_{ap}$. In particular, it can be seen that increasing $d_{ap}$ leads to an increase in $S_{ap}$ and to a decrease in $d_{vmax,ap}/d_{ap}$ down to values<1, allowing the particles to penetrate into the cavity. In contrast, the present calculations with the configuration of Z'Graggen reveal that this case is characterized by $d_{vmax,ap}/d_{ap}<1$ together with a very high $S_{ap}$, which is consistent with a strong propensity to transport particles through the aperture, which is consistent with experimental observations that this configuration is highly vulnerable to particle deposition. (This observation also highlights the importance of positioning the inlet of the reactor at the opposite end of the chamber to the aperture to obtain a much weaker vortex at the aperture plane). Combining the above information, it is hypothesised that those configurations which generate a vortex core larger than dap ($d_{vmax,ap}/d_{ap}>1$) at the aperture plane, will also generate a low intensity of the vortex there, and thus mitigate the potential for particle deposition onto the reactor window.

FIG. 11 presents the measured and calculated total mass of particles deposited onto the reactor window relative to the total mass of inlet particles, $m_{p,window}/m_{p,in}$, varying the particle size, $d_p$, for different $d_{ap}/D_c$ and a constant particle load ($\o=2e^{-5}$). The geometrical details of the SEVR configurations experimentally investigated are presented in FIG. 12 as Table 2. In the experimental campaign the flow was seeded with inert particles and the particle concentration onto the reactor window was measured by weighing the particles collected onto the window using a high precision balance ($10^{-4}$ g accuracy). The particles adopted in this study were solid polymer spheres (Microbeads Spheromers) of mean diameter, $d_p=10$, 20 and 40 μm, and a standard deviation of $\sigma_p\leq5\%$. The narrow size distribution was central to the particle selection, making the particle size distribution truly mono-disperse. A mono-sized particle injection with diameters $d_p=100$ μm was also considered in the numerical analysis. The density of the particle is $\rho_p=1200$ kg/m3.

It can be seen that good agreement between the CFD model and the measured deposition was found. It can be seen that for small particles the particle deposition increases as the aperture diameter increase. For reactor configurations characterised by $d_{vmax,ap}/d_{ap}>1$ ($d_{ap}/D_c=0.125$ and 0.25), the intensity of the vortex at the plane of the aperture is insufficient to propel particles through the aperture. In particular, for these configurations, the measured particle deposition was extremely low ($m_{p,window}/m_{p,in}<0.1\%$), confirming the predictions of the model. In addition, for all the reactor configurations investigated, the larger particles ($d_p=100$ μm) were found not to deposit onto the reactor window, further highlighting the potential benefits of the present invention in comparison with previous SVR configurations.

A second embodiment of the invention is shown in FIG. 13. The second embodiment is similar in some respects to the first embodiment and corresponding reference numerals are used to identify corresponding parts.

In the second embodiment, the second section 42 of the chamber 13 is also conical. In particular, the second section 42 is conical about the central longitudinal axis 29 of the chamber 13 and comprises a continuation of the conical first chamber section 41. In other words, the chamber 13 has a conical side 27, with a first portion 27*a* of the conical side 27 bounding the first chamber section 41, and a second portion 27*b* of the conical side 27 bounding the second chamber section 42.

From the foregoing, it is evident that various embodiments of the solar receiver according to the invention can be configured to achieve two effects: (i) mitigation of particle deposition onto an aperture window; and (ii) aerodynamic classification to allow large particles to be preferentially retained in the solar receiver/reactor for much longer than small particles and so to achieve efficient processing of particles with a wide size distribution.

Various embodiments of the solar receiver according to the invention can be configured to achieve the above two effects, according to the following design criteria:
1) The solar receiver can be oriented either vertically or horizontally. In both cases the SEVR improves the control of the residence time with respect to particle size in comparison with previous SVR configurations. For the case with a vertical orientation this control is augmented.
2) A conical inlet base is required to provide a means with which to change the trajectories of the larger particles relative to the smaller particles at the corner where the cone meets the cylinder. Furthermore the cone funnels any recirculated particles back to the most intense part of the vortex, rather than allowing them to settle on to the chamber wall.
3) At least one outlet oriented in the radial direction and positioning it below the corner of the cavity (below the plane of the aperture) is required to inhibit larger particles from leaving the device relative to the smaller particles and thus, to further allow large particles to be retained in the reactor for much longer than small particles.
4) At least one tangentially inlet is required to generate a vortex flow within the cavity.
5) The inlet to the receiver/reactor needs to be located at the opposite end of the chamber to the aperture. Together with the addition of a conical expansion, this generates a vortex whose intensity is much weaker at the plane of the aperture, reducing the axial transport of particles through the aperture along the vortex core. Furthermore, the presence of the conical base and the inlet to the receiver/reactor at the opposite end of the chamber generates a central recirculation zone that drives the particles away from the aperture rather than toward it, thus reducing the propensity of the particles to penetrate into the SC cavity. Finally, with this arrangement, the vortex structure in the lower part of the receiver/reactor approaches that of a forced vortex, while in the upper part of the receiver/reactor, it approaches that of a combined (free and forced) vortex.
6) The diameter of the aperture is required to be smaller than the diameter of the vortex core at the plane of the aperture to inhibit the transport of particles through the aperture. The angle of the cone influences the diameter and the intensity of the vortex at the plane of the aperture. For a fixed cone angle, a value of the aperture diameter to the reactor diameter ratio, $d_{ap}/D_c$, in the range of about 0.125 to 0.25 is required to reduce the particle deposition.
7) A value of the angle of the cone in the range 40° to 65° are required to achieve the above two effects (of recirculating larger particles and reducing deposition) whilst reducing the propensity for particles to settle onto the walls of the expansion. The optimal value of the cone angle is approximately 45°.

It should be appreciated that the scope of the invention is not limited to the scope of the embodiments described as examples.

While the present invention has been described in terms of a preferred embodiments in order to facilitate better understanding of the invention, it should be appreciated that various modifications can be made without departing from the principles of the invention. Therefore, the invention should be understood to include all such modifications within its scope.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment was chosen and described to provide the best illustration of the principle of the described technology and its practical application, and to enable one of ordinary skill in the art to utilise the technology in various embodiments and with various modifications as are suited to the particular use contemplated.

Reference to positional descriptions, such as "upper", "lower", "top", and "bottom", "front", "rear" and "side" are to be taken in context of the embodiments depicted in the drawings, and are not to be taken as limiting the invention to the literal interpretation of the term but rather as would be understood by the skilled addressee.

Additionally, where the terms "system", "device" and "apparatus" are used in the context of the invention, they are to be understood as including reference to any group of functionally related or interacting, interrelated, interdependent or associated components or elements that may be located in proximity to, separate from, integrated with, or discrete from, each other.

Throughout this specification, unless the context requires otherwise, the word "comprise" or variations such as "comprises" or "comprising", will be understood to imply the inclusion of a stated integer or group of integers but not the exclusion of any other integer or group of integers.

The invention claimed is:

1. A solar receiver comprising:
a chamber having an aperture through which concentrated solar radiation can be received within the chamber,
an inlet means for introduction into the chamber of an inflow comprising solar absorbing particles,
an outlet means for discharge of an outflow from the chamber,
the inlet means communicating with the chamber for introduction of the inflow into a first section of the chamber in opposed relation the aperture,
the outlet means communicating with a second section of the chamber disposed between the first section and the aperture,
wherein fluid flow from the inlet means to the outlet means is exposed to concentrated solar radiation received within the chamber and wherein the flow establishes a flow field having a vortex structure, with the intensity of the vortex being greater in the first section of the chamber than in the second section of the chamber, wherein said first section is configured as a divergent section expanding in a direction towards the aperture.

2. The solar receiver according to claim 1 wherein the inlet means is configured to introduce the inflow tangentially into the divergent first section.

3. The solar receiver according to claim 1 wherein the first section is defined by a conical wall.

4. The solar receiver according to claim 3 wherein the chamber has a central longitudinal axis and the conical wall is centered on the central longitudinal axis.

5. The solar receiver according to claim 3 wherein the conical wall defining the first chamber section has a cone angle in the range of about 15 degrees to 65 degrees.

6. The solar receiver according to claim 4 wherein the second section of the chamber is centered on the central longitudinal axis of the chamber.

7. The solar receiver according to claim 6 wherein the second section is configured to be conical or cylindrical about the central longitudinal axis of the chamber.

8. The solar receiver according to any one of the preceding claims wherein the first and second sections define a chamber wall and a circumferential edge in the chamber wall.

9. The solar receiver according to claim 4 wherein the aperture is of circular configuration centered on the central longitudinal axis.

10. The solar receiver according to claim 9 wherein the aperture is surrounded by a wall of the chamber.

11. The solar receiver according to claim 1 wherein the chamber comprises a front end and a rear end, the front end incorporating the aperture for receiving concentrated solar radiation and the rear end incorporating the inlet means.

12. The solar receiver according to claim 1 wherein the outlet mean opens into the chamber through a side thereof at a location spaced from and in close proximity to the aperture.

13. A solar receiver comprising:
a chamber having an aperture through which concentrated solar radiation can be received within the chamber,
an inlet means for introduction into the chamber of an inflow comprising solar absorbing particles,
an outlet means for discharge of an outflow from the chamber,
the inlet means communicating with the chamber for introduction of the inflow into a first section of the chamber in opposed relation the aperture,
the outlet means communicating with a second section of the chamber disposed between the first section and the aperture,
wherein fluid flow from the inlet means to the outlet means is exposed to concentrated solar radiation received within the chamber,
the first section being divergent in a direction towards the aperture,
the first section of the chamber being defined by a wall of conical configuration to thereby provide the divergent configuration, and
the inlet means being configured to introduce the inflow tangentially into the divergent first section.

14. A method of exposing heat absorbing particles to concentrated solar radiation using a solar receiver according to claim 1.

15. A method of heating particles by exposure of the particles to concentrated solar radiation using a solar receiver according to claim 13.

16. A method of heating particles through exposure of the particles to concentrated solar radiation, comprising the steps of:
establishing a fluid flow comprising the particles;
introducing the fluid flow into a solar receiver in which the particles are exposed to concentrated solar radiation entering the chamber through an aperture;
the flow being introduced into a first section of the chamber remote from the aperture to establish a flow field having a vortex structure, with the intensity of the vortex being greater in the first section of the chamber than in a second section of the chamber closer to the aperture;
wherein the flow field promotes aerodynamic classification to control residence time distribution of the particles within the chamber as a function of particle size,
whereby the residence time of larger particles is increased in relation to that of small particles,
wherein said first section is configured as a divergent section expanding in a direction towards the aperture.

17. A method of exposing heat absorbing particles to concentrated solar radiation using a solar receiver according to claim 13.

18. The solar receiver according to claim 2, wherein the outlet mea ns is disposed radially to the chamber in close proximity to the aperture.

* * * * *